United States Patent

Wade

[11] Patent Number: 5,357,753
[45] Date of Patent: Oct. 25, 1994

[54] CATALYST MONITOR FOR A Y PIPE EXHAUST CONFIGURATION

[75] Inventor: Wallace R. Wade, Farmington Hills, Mich.

[73] Assignee: Ford Motor Company, Dearborn, Mich.

[21] Appl. No.: 167,303

[22] Filed: Dec. 16, 1993

[51] Int. Cl.$^5$ ............................................. F02B 3/00
[52] U.S. Cl. .............................. 60/274; 60/276; 60/285
[58] Field of Search ............. 60/273, 274, 276, 285, 60/286

[56] References Cited

U.S. PATENT DOCUMENTS

| | | | |
|---|---|---|---|
| 4,130,095 | 12/1978 | Bowler | 60/276 |
| 4,235,204 | 11/1980 | Rice | 60/276 |
| 4,373,330 | 2/1983 | Stark | 60/295 |
| 4,819,427 | 4/1989 | Nagai et al. | 60/285 |
| 4,831,838 | 5/1989 | Nagai et al. | 60/276 |
| 4,881,368 | 11/1989 | Demura | 60/274 |
| 4,905,469 | 3/1990 | Matsuoka | 60/276 |
| 4,964,271 | 10/1990 | Sawada | 60/274 |
| 4,964,272 | 10/1990 | Kayanuma | 60/274 |

Primary Examiner—Ira S. Lazarus
Assistant Examiner—Daniel J. O'Connor
Attorney, Agent, or Firm—Peter Abolins; Roger L. May

[57] ABSTRACT

Monitoring a catalyst positioned downstream of a Y-shaped exhaust path includes positioning an exhaust gas oxygen sensor just upstream and just downstream of the catalyst and using the two sensors together to monitor catalyst activity. Such monitoring is discontinued when the exhaust gas oxygen sensor switching rate of the upstream exhaust gas oxygen sensor is below a minimum threshold value. The upstream exhaust gas oxygen sensor does not provide an air fuel ratio feedback signal but instead, such a signal is provided by two additional exhaust gas oxygen sensors, one sensor being positioned in each of the two legs of the Y exhaust path coming from the engine.

7 Claims, 1 Drawing Sheet

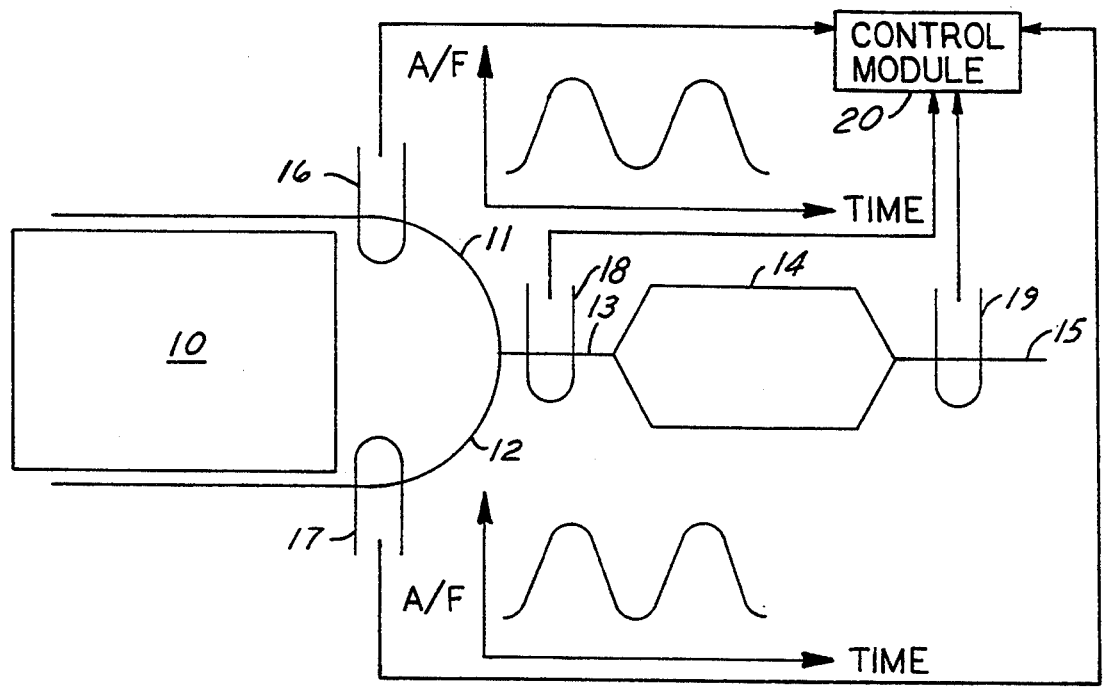
FIG.1
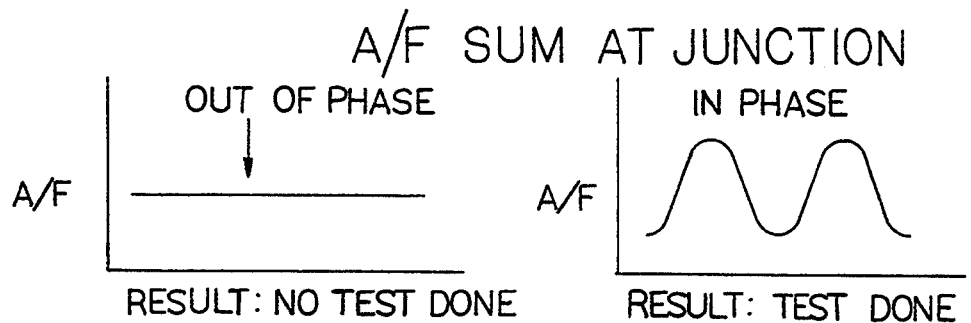
FIG.2A
FIG.2B
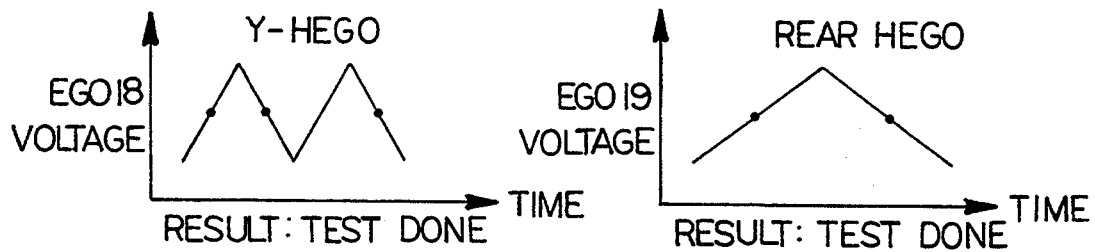
FIG.3A
FIG.3B

CATALYST MONITOR FOR A Y PIPE EXHAUST CONFIGURATION

BACKGROUND OF THE INVENTION

1. Field of the Invention

This invention relates to electronic engine control and diagnostics for an internal combustion engine.

2. Prior Art

Internal combustion engines can have a catalyst in the exhaust path to reduce the occurrence of certain gases coming out of the exhaust path. Often it is desirable to confirm proper operation of such catalysts. A known onboard catalyst monitor method uses an engine heated exhaust gas oxygen (HEGO) sensor before the catalyst and a catalyst monitor HEGO sensor after the catalyst. The ratio of HEGO switches (rear/front) is related to the catalyst hydrocarbon (HC) efficiency. Further, the front HEGO sensor is used as a feedback element in a feedback air fuel ratio control system.

Such catalyst monitoring is done in a relatively straight forward manner when an engine has a single exhaust pipe coming out to a catalyst. With a Y pipe exhaust configuration on a V block engine, this straight forward monitoring has drawbacks because a single HEGO sensor just forward of the catalyst is exposed to output gases from each leg of the Y-exhaust output coming from the two banks of the V block engine. Thus, this HEGO sensor may experience the following three inputs. First, the air/fuel ratio of the gas from the two legs of the Y can be out of phase (particularly if the legs are unequal length) so that the air/fuel perturbation will be canceled out at the entrance to the catalyst. Second, the air/fuel ratio of the gas from the two legs of the Y can be in phase so that the air/fuel perturbation will be reinforced at the entrance to the catalyst. Third, the air/fuel ratio entering the catalyst could consist of an air/fuel ratio in between the previous first and second extreme cases.

Thus this HEGO is no longer effective as a feedback element for controlling an air fuel ratio feedback control system. Further, this HEGO element is not effective in acting together with the rear HEGO in order to monitor the operation of the catalyst. There is no known way to monitor the catalyst downstream of a Y pipe exhaust connection. In such a system, the HEGO sensors used for controlling air/fuel ratio were in the left and right exhaust manifolds or exhaust pipes. It would be desirable to have a monitor for a catalyst used with a Y-pipe exhaust configuration.

SUMMARY OF THE INVENTION

A catalyst monitor method in accordance with an embodiment of this invention applied to a Y shaped exhaust gas configuration has one HEGO sensor located in each of the Y-legs upstream of the position where the two legs join so as to detect exhaust gas coming from one of the engine banks. Upstream of the catalyst and downstream of where the two legs of the Y join, a third HEGO sensor is positioned in the exhaust stream. The third HEGO sensor acts in conjunction with the rear HEGO sensor, positioned downstream of the catalyst, to act as a catalyst monitor. The third HEGO sensor does not act as a feedback element for the air/fuel ratio control system, but the two HEGOs in the legs of the Y configuration perform this feedback element function.

In operation, the catalyst monitor is disabled unless the HEGO sensor at the entrance to the catalyst is switching at a minimum threshold value. When the HEGO sensor at the entrance to the catalyst is switching at the minimum threshold value, the number of HEGO switches for the front and rear sensors are recorded for a specified mass air flow condition. When the specified number of front HEGO switches are recorded in each mass air flow condition, the total number of rear HEGO switches are divided by the nun%her of front HEGO switches to provide an overall HEGO switch ratio (rear/front). This ratio is related to the catalyst HC efficiency. When the catalyst deteriorates to a level where the HEGO switch ratio exceeds a specified value, a visual indication may be given to the operator of the vehicle.

BRIEF DESCRIPTION OF DRAWINGS

FIG. 1 is schematic drawing of an engine, a Y exhaust, a catalyst and exhaust gas oxygen sensors in the Y, and fore and aft of the catalyst, and wave forms at the exhaust gas oxygen sensors in each of the legs of the Y exhaust path;

FIGS. 2A and 2B are graphical presentations of air fuel ratio versus time of the HEGO sensor at the junction of the Y just upstream of the catalyst whereby at 2A there is an out of phase air fuel ratio applied to the upstream catalyst HEGO sensor resulting in a no test condition and FIG. 2B is an in phase air fuel ratio applied to the upstream exhaust gas oxygen catalyst resulting in a test situation; and FIGS. 3A and 3B are graphical presentations of the output of HEGO sensors used together as a catalyst monitor versus time, the FIG. 3A representing the upstream exhaust gas oxygen sensor and FIG. 3B representing the downstream exhaust gas oxygen sensor.

DETAILED DESCRIPTION OF THE INVENTION

Referring to FIG. 1, an engine 10 has a exhaust path 11 and an exhaust path 12 from each bank of the engine which are joined together in an exhaust path 13 which is applied to a catalyst 14. From catalyst 14 an exhaust path 15 passes the exhaust gas to the outside. An exhaust gas oxygen sensor 16 is located in exhaust path 11, an exhaust gas oxygen sensor 17 is located in exhaust path 12, an exhaust gas oxygen sensor 18 is located in exhaust path 13 and an exhaust gas oxygen sensor 19 is located in exhaust path 15. Adjacent exhaust gas oxygen sensor 16 is a typical air fuel ratio amplitude signal versus time characterizing the exhaust gas carried in path 11. Adjacent exhaust gas oxygen sensor 17 is an air fuel ratio amplitude signal versus time characterizing the exhaust gas carried in exhaust path 12. A catalyst monitoring control module 20 is coupled to exhaust gas oxygen sensors 18 and 19 to sense a switching rate of sensors 18 and 19 and to determine when monitoring of catalyst 19 can occur. Control module 20 is also coupled to exhaust gas oxygen sensors 16 and 17 to sense switching signals used for air/fuel ratio control.

Referring to FIG. 2, the air fuel ratio in exhaust path 13 is the sum of the air fuel ratios in exhaust path 11 and exhaust path 12. If the air fuel ratios in exhaust path 12 and exhaust 11 are out of phase, the air fuel ratio in exhaust path 13 is substantially constant as shown in FIG. 2A. In this condition, no monitoring of the functioning of catalyst 14 is done. Monitoring is made possible by the presence of a forcing function such as a variation in air fuel ratio. Rear exhaust gas oxygen sensor 19 can then detect the effect catalyst 14 has on the forcing function and thus, indirectly, the condition of catalyst 14. If the air fuel ratio of the exhaust in exhaust path 11 and exhaust path 12 are in phase, the air fuel ratio of the exhaust gas in exhaust path 13 is also in phase as indicated in FIG. 2B. This is a suitable test condition wherein a test of the catalyst can be done.

Referring to FIG. 3A, the output of exhaust gas oxygen sensor 18 is shown during a test condition. Referring to FIG. 3B, the output of rear exhaust gas oxygen sensor 19 is shown during the test condition specified in FIG. 2B. As is known, by comparing the outputs of exhaust gas oxygen sensor both upstream and downstream of catalyst 14 the effectiveness of catalyst 14 in acting on the exhaust gas passing through catalyst 14 can be determined.

Exhaust gas oxygen sensors 16 and 17 are appropriately positioned to act as feedback elements of an air fuel ratio feedback control system, but do not act to monitor catalyst 14. Exhaust gas oxygen sensor 18 does not act as a feedback element for an air fuel ratio control system and thus does not provide a feedback signal. Instead, exhaust gas oxygen sensors 18 and 19 act together to monitor the condition of catalyst 14.

Various modifications and variations will no doubt occur to those skilled in the arts to which this invention pertains. Such variations which basically rely on the teachings of through which this disclosure has advanced the art are properly considered within the scope of this invention.

I claim:

1. A method of monitoring a catalyst processing the exhaust gas from an internal combustion engine having two exhaust gas banks wherein the exhaust gas passes from each side of the internal combustion engine through a Y-shaped exhaust path to the catalyst wherein two legs of the Y exhaust path are coupled as the banks of the engine and a trunk of the Y exhaust path is coupled to the catalyst and a first exhaust gas oxygen sensor is located upstream of the catalyst in the trunk of the Y exhaust path and a second exhaust gas oxygen sensor is located downstream of the catalyst, the first and second exhaust gas oxygen sensors acting together to perform a catalyst monitoring function, including the steps of:

sensing the switching rate of the first upstream exhaust gas oxygen sensor;

disabling the catalyst monitoring function when exhaust gas oxygen sensor switching of the first upstream exhaust gas oxygen sensor is below a minimum threshold value;

recording the number of exhaust gas oxygen sensor switches for the first upstream and second downstream sensors for a specified mass air flow condition when the first upstream exhaust gas oxygen sensor is switching above the minimum threshold value;

determining a ratio indicating catalyst hydrocarbon processing efficiency by dividing the number of second downstream exhaust gas oxygen sensor switches by the number of first upstream exhaust gas oxygen switches after a specified number of first upstream exhaust gas oxygen switches have been recorded; and indicating a fault when the exhaust gas oxygen switch ratio exceed a specified value.

2. A method of monitoring a catalyst as recited in claim 1 wherein said first upstream exhaust gas oxygen sensor is used only in conjunction with catalyst monitoring and does not act as a feedback element to provide a feedback signal for an air fuel ratio feedback control system.

3. A method of monitoring a catalyst as recited in claim 2 further comprising a third upstream exhaust gas oxygen sensor positioned in one of the two legs of the Y exhaust path and a fourth exhaust gas oxygen sensor positioned in the other of the two legs of the Y exhaust path, said third and fourth gas oxygen sensors acting as feedback elements for providing a feedback signal to be used in conjunction with an air fuel ratio feedback control system.

4. A method of monitoring a catalyst as recited in claim 3 wherein the step of disabling the catalyst monitoring function when exhaust gas oxygen sensor switching of the first upstream exhaust gas oxygen sensor is below minimum threshold value includes not monitoring the catalyst when the air fuel ratio is in the two legs of the Y exhaust path are substantially out of phase with each other.

5. An apparatus for monitoring a catalyst processing the exhaust gas from an internal combustion engine having two exhaust gas banks wherein the exhaust gas passes from each side of the internal combustion engine through a Y-shaped exhaust path to the catalyst wherein two legs of the Y exhaust path are coupled as the banks of the engine and a trunk of the Y exhaust path is coupled to the catalyst, and including:

a first exhaust gas oxygen sensor located upstream of the catalyst in the trunk of the Y exhaust path;

a second exhaust gas oxygen sensor located downstream of the catalyst; and a catalyst monitoring module means coupled to said first and second exhaust gas oxygen sensors for having the first and second exhaust gas oxygen sensors act together to perform a catalyst monitoring function by sensing the switching rate of the first upstream exhaust gas oxygen sensor; disabling the catalyst monitoring function when exhaust gas oxygen sensor switching of the first upstream exhaust gas oxygen sensor is below a minimum threshold value; recording the number of exhaust gas oxygen sensor switches for the first upstream and second downstream sensors for a specified mass air flow condition when the first upstream exhaust gas oxygen sensor is switching above the minimum threshold value; determining a ratio indicating catalyst hydrocarbon processing efficiency by dividing the number of second downstream exhaust gas oxygen sensor switches by the number of first upstream exhaust gas oxygen switches after a specified number of first upstream exhaust gas oxygen switches have been recorded; and indicating a fault when the exhaust gas oxygen switch ratio exceed a specified value.

6. An apparatus as recited in claim 5 further comprising a third upstream exhaust gas oxygen sensor positioned in one of the two legs of the Y exhaust path and a fourth exhaust gas oxygen sensor positioned in the other of the two legs of the Y exhaust path, said third and fourth gas oxygen sensors acting as feedback elements for providing a feedback signal to be used in conjunction with an air fuel ratio feedback control system.

7. An apparatus as recited in claim 6 wherein said catalyst monitoring module can disable the catalyst monitoring function when exhaust gas oxygen sensor switching of the first upstream exhaust gas oxygen sensor is below minimum threshold value and does not monitor the catalyst when the air fuel ratio is in the two legs of the Y exhaust path are substantially out of phase with each other.

* * * * *